United States Patent [19]

Ikemoto et al.

[11] Patent Number: 4,606,238
[45] Date of Patent: Aug. 19, 1986

[54] MOUNTING CONSTRUCTION OF SHIFT LEVER RETAINER CASING IN CHANGE-SPEED GEARING UNIT

[75] Inventors: Kazuhito Ikemoto; Nobuaki Katayama; Yukio Terakura, all of Toyota; Kan Sasaki, Aichi, all of Japan

[73] Assignee: Toyota Jidosha Kogyo Kabushiki Kaisha, Toyota, Japan

[21] Appl. No.: 288,018

[22] Filed: Jul. 29, 1981

[30] Foreign Application Priority Data

Aug. 20, 1980 [JP] Japan .............. 55-117922[U]
Nov. 20, 1980 [JP] Japan .............. 55-167919[U]

[51] Int. Cl.⁴ .................................................. G05G 9/12
[52] U.S. Cl. ........................... 74/473 R; 74/606 R; 248/638; 277/97
[58] Field of Search ............. 74/473 R, 606 R, 467; 277/97, 235 R, 235 A, 180 B; 16/2, 108; 248/638

[56] References Cited

U.S. PATENT DOCUMENTS

| | | | |
|---|---|---|---|
| 918,969 | 4/1909 | Cole | 16/2 |
| 1,099,413 | 6/1914 | Widney | 16/2 |
| 1,886,849 | 11/1932 | Tenny et al. | 74/473 P |
| 1,927,646 | 9/1933 | Miller | 74/473 P |
| 2,198,662 | 4/1940 | Fishburn | 74/473 R |
| 3,061,321 | 10/1962 | Smith | 277/180 |
| 3,195,906 | 7/1965 | Moyers | 277/180 |
| 3,323,609 | 6/1967 | Rosenberger et al. | 74/473 |
| 3,392,228 | 7/1968 | Zerwes | 277/235 |
| 3,542,382 | 11/1970 | Hagmann | 277/235 R |
| 3,732,746 | 5/1973 | Fitzpatrick | 74/473 R |
| 3,918,316 | 11/1975 | Reinhold et al. | 74/473 P |
| 3,974,711 | 8/1976 | Hurst, Jr. et al. | 74/473 R |
| 4,295,691 | 10/1981 | Rubenthaler | 16/2 |

FOREIGN PATENT DOCUMENTS

| | | | |
|---|---|---|---|
| 2831217 | 1/1980 | Fed. Rep. of Germany | 277/235 A |
| 50-38698 | 11/1975 | Japan | |
| 51-47698 | 11/1976 | Japan | |
| 836669 | 6/1960 | United Kingdom | 277/180 |

*Primary Examiner*—Allan D. Herrmann
*Attorney, Agent, or Firm*—Oblon, Fisher, Spivak, McClelland & Maier

[57] ABSTRACT

In a change-speed gearing unit, a manual shift lever is mounted at its lower end on a retainer casing which is secured at its outer peripheral portion to the upper seating face of an extension housing for the unit by means of fastening bolts threaded into the housing with intervention of an oil buffer member of elastic material between the outer peripheral portion of the casing and the upper seating face of the housing. A first plurality of fastening bolts adjacent to the lower end of the shift lever are directly engaged with the outer peripheral portion of the retainer casing to prevent floating of the casing, and a second plurality of fastening bolts are engaged respectively through a plurality of elastic members with the outer peripheral portion of the casing such that the casing is floatably secured in place due to resiliency of the oil buffer member.

4 Claims, 7 Drawing Figures

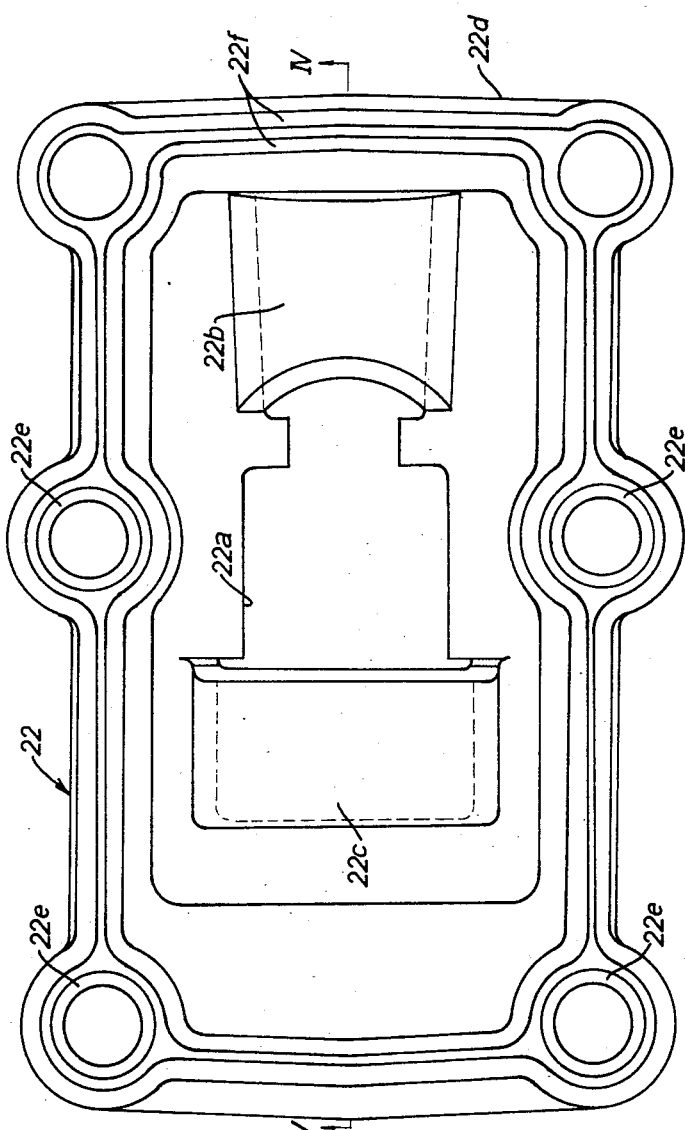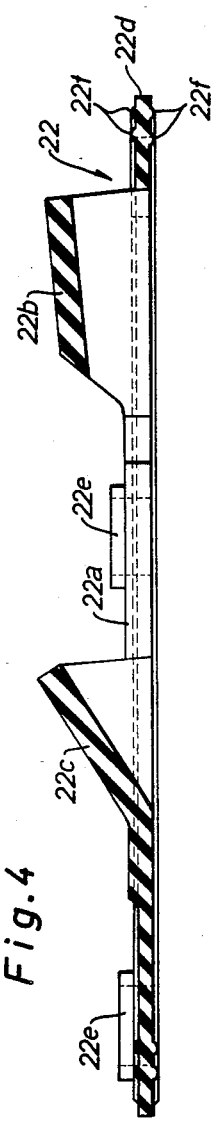
Fig. 3
Fig. 4

MOUNTING CONSTRUCTION OF SHIFT LEVER RETAINER CASING IN CHANGE-SPEED GEARING UNIT

BACKGROUND OF THE INVENTION

The present invention relates to change-speed gearing units for motor vehicles, and more particularly to a change-speed gearing unit of the direct operation type in which a manual shift lever is mounted at its lower end on a retainer casing in such a way as to be selectively shifted, the retainer casing being secured at its outer peripheral portion to the upper seating face of an extension housing for the unit by means of a plurality of fastening bolts threaded into the housing with intervention of an oil buffer or interseptum member of elastic material between the outer peripheral portion of the retainer casing and the upper seating face of the housing.

In such a mounting construction of the retainer casing as described above, it is required to effectively absorb vibration acting on the retainer casing so as to eliminate unpleasant noises and vibrations dissipated into the passenger compartment through the retainer casing from the interior of the extension housing. It is also required to restrict relative displacements of the retainer casing with respect to the extension housing as small as possible to ensure a good operational feel in shift-and-select operation of the shift lever and to enhance the sealing effect between the extension housing and the retainer casing so as to prevent oil leakage from the fitted portion between the buffer member and the upper seating face of the housing.

SUMMARY OF THE INVENTION

It is, therefore, a primary object of the present invention to provide an improved mounting construction of a shift lever retainer casing capable of effectively absorbing vibration acting on the retainer casing and restricting undesired relative displacements of the retainer casing with respect to an extension housing to ensure a good operation feel in shift-and-select operation of a manual shift lever mounted on the retainer casing.

Another object of the present invention is to provide an improved mounting construction of a shift lever retainer casing, having the above-mentioned characteristics, capable of reliably preventing oil leakage from the interior of the extension housing on which the retainer casing is mounted.

According to the present invention briefly summarized there is provided a change-speed gearing unit of the type which includes an extension housing formed with an upper seating face defining an upper opening, a retainer casing secured at its outer peripheral portion to the upper seating face of the housing by means of a plurality of fastening bolts threaded into the housing with intervention of an oil buffer or interseptum member of elastic material between the outer peripheral portion of the retainer casing and the upper seating face of the housing, and a manual shift lever mounted at its lower end on the retainer casing in such a way as to be selectively shifted. The present invention is directed to an improvement wherein the fastening bolts adjacent to the lower end of the shift lever are directly engaged with the outer peripheral portion of the retainer casing to prevent floating of the retainer casing, and the remaining fastening bolts are engaged respectively through an elastic member with the outer peripheral portion of the retainer casing such that the retainer casing is floatably secured in place due to resiliency of the oil buffer member.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 3 is a plan view of an oil buffer member attached to the upper seating face of the extension housing shown in FIG. 1;

FIG. 4 is a sectional view taken along line IV—IV in FIG. 3;

DESCRIPTION OF THE PREFERRED EMBODIMENT

Figure 1:
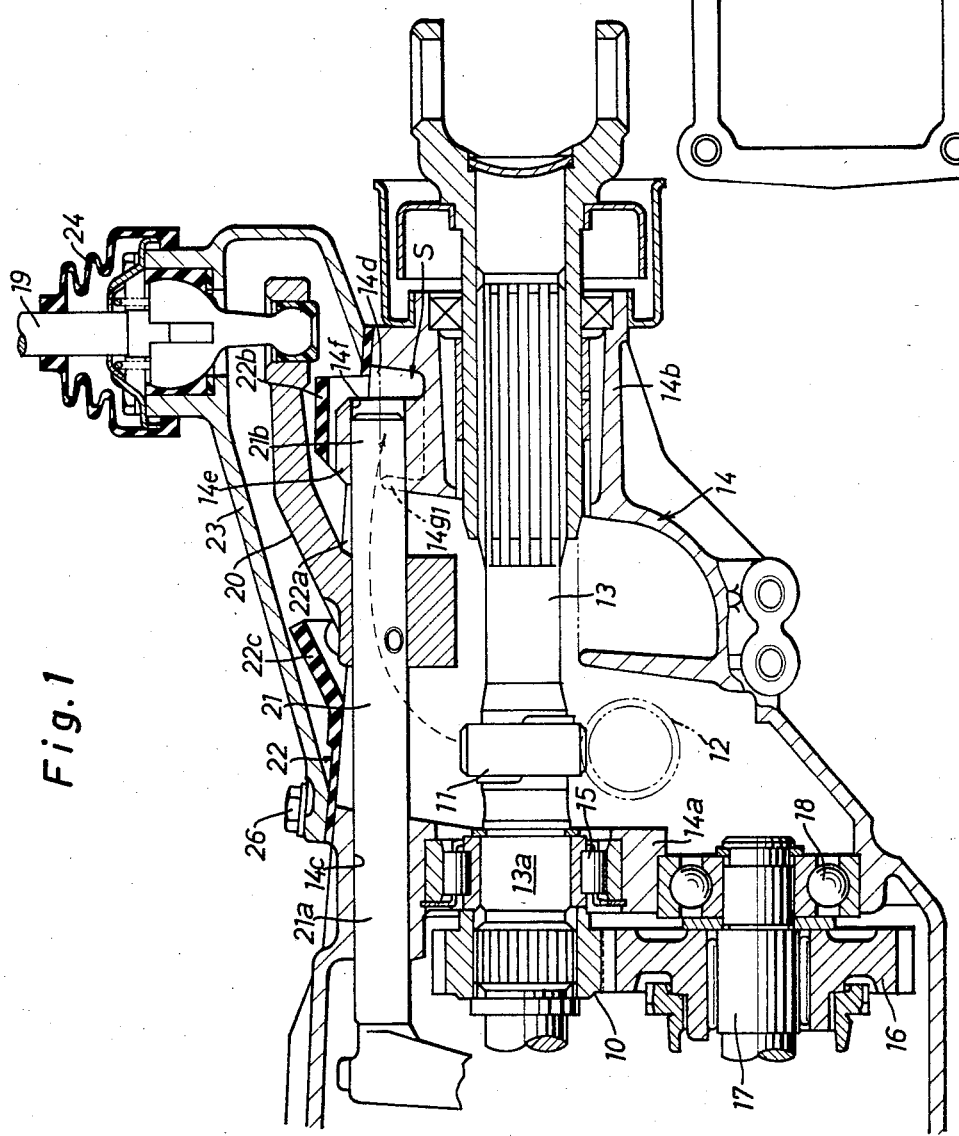
FIG. 1 is a sectional view showing the rear interior of a change-speed gearing unit.

Referring now to the drawings, FIG. 1 illustrates the rear interior of a change-speed gearing unit of the direct-operation type, in which an output shaft 13 extends in an axial direction through the interior of an extension housing 14 secured in a fluid-tight manner to a transmission casing (not shown) for the unit. The output shaft is rotatably supported at its intermediate portion 13a by means of a bearing 15 carried in an upright partition wall 14a of housing 14. The output shaft 13 is provided thereon with a fifth-speed driven gear 10 splined on output shaft 13 and a speedometer drive gear 11 fixed to output shaft 13 and in mesh with a speedometer driven gear 12. In addition, the rear end portion of output shaft 13 is rotatably supported in a usual manner from the rear end portion 14b of housing 14 and extends outwardly from housing 14. A counter-gear shaft 17 is arranged in parallel with output shaft 13 and is rotatably supported by a bearing 18 carried in partition wall 14a. A fifth-speed drive 16 is freely rotatable on counter-gear shaft 17 and permanently in mesh with the driven gear 10 to complete a fifth-speed gear train when engaged with counter-gear shaft 17.

Arranged within the rear interior of the gearing unit is a shift-and-select lever shaft 21 which may be rotated or axially shifted by a manual shift lever 19 by way of a shoft-lever housing 20. The lever shaft 21 is axially slidably supported at its front portion 21a by an axial bearing hole 14c in the upper portion of partition wall 14a and at its rear end 21b by an axial bearing hole 14f formed in an upright projection 14e. The upright projection 14e is integrally formed on the rear end portion 14b of housing 14 and is located within the upper opening portion 14d of housing 14 on which portion a shift-lever retainer casing 23 is secured by way of an oil buffer or interseptum member 22 of elastic material such as synthetic rubber to close the upper opening of housing 14. The shift lever 19 is mounted at its lower end on the retainer casing 23 in such a way as to be selectively tilted in the fore-and-aft directions and in the left and right directions, and it is covered at its leg portion by a rubber boot 24 coupled over the retainer casing 23.

Figure 2:
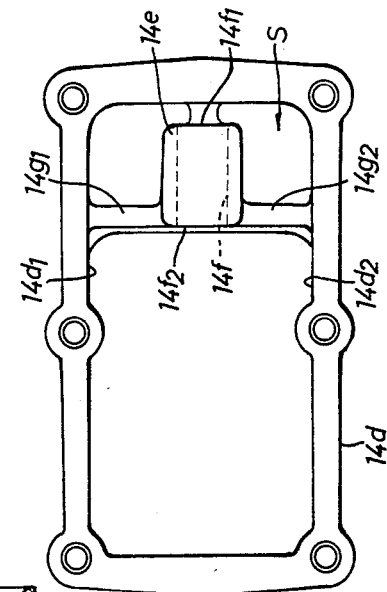
FIG. 2 is a plan view of the upper opening portion of the extension housing shown in FIG. 1.
Figure 5:
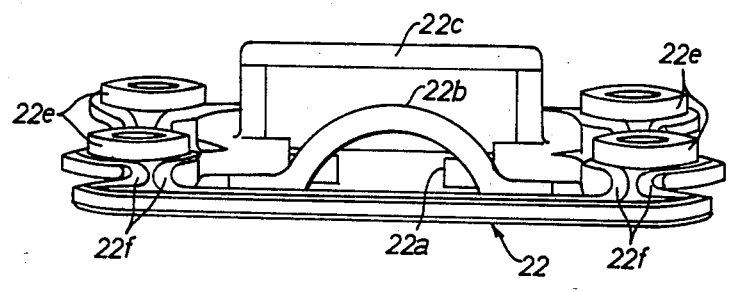
FIG. 5 is a front view of the buffer member.

As can be well seen in FIGS. 1 and 2, a pair of laterally upright walls $14g_1$ and $14g_2$ are integrally formed on the rear end portion $14b$ of housing 14 between both faces of upright projection $14e$ and both opposed inner walls $14d_1$ and $14d_2$ of upper opening portion $14d$ to form an oil well S in open communication with the rear opening $14f_1$ of axial bearing hole $14f$. With this construction, lubricating oil picked up by speedometer gears 11 and 12 flows into the oil well S during operation of the change-speed gearing, and the stored lubricating oil in well S flows through axial bearing hole $14f$ from its rear opening $14f_1$ to lubricate the rear sliding portion $21b$ of shift-and-select lever 21 within axial bearing hole $14f$. Subsequently, the lubricating oil drops into the interior of housing 14 from the front opening $14f_2$ of axial bearing hole $14f$. This serves to ensure sufficient lubrication of the rear sliding portion $21b$ of shaft 21 within axial bearing hole $14f$ and to ensure smooth sliding movement of shaft 21 thereby providing a good operational feel in the shifting of shift lever 19.

As can be well seen in FIGS. 1, 3, 4 and 5, the oil buffer member 22 seals at its outer periphery the rearwards inclined joint portion of housing 14 and retainer casing 23 and closes the whole upper opening portion $14d$ of housing 14 except for an opening $22a$ through which the shift-lever housing 20 extends upwardly. The buffer member 22 includes an upwardly arched portion $22b$, in order to cover the head of upright projection $14e$ with a slight clearance, and a rearwardly and upwardly inclined portion $22c$ located above the leg portion of shift-lever housing 20. It is preferred that the inclined portion $22c$ of buffer member 22 be as closely adjacent as possible to the shift-lever housing 20 without any interference in the operation of the same. With this arrangement, the buffer member 22 serves to interrupt, for the most part, the upward flow of lubricating oil picked up by speedometer gears 11, 12 and thus prevent oil leakage from boot 24, and further serves to absorb noises from the interior of housing 14. Furthermore, a portion of the picked up lubricating oil is received and directed rearwards by the inclined portion $22c$ of buffer member 22 and then induced into the oil well S.

Figure 6:
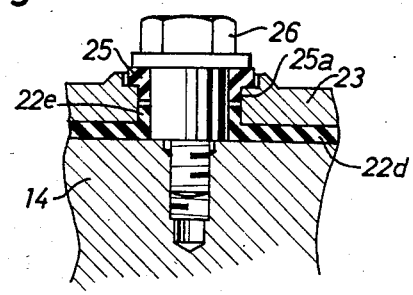
FIG. 6 depicts a cross-section of the front fixing arrangement of the retainer casing shown in FIG. 1.
Figure 7:
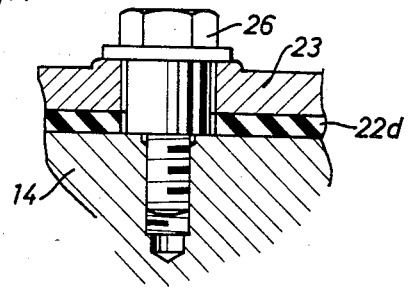
FIG. 7 depicts a cross-section of the rear fixing arrangement of the retainer casing.

In the embodiment described above, the outer peripheral portion of retainer casing 23 is fixed at four points of its front portion to the upper seating face of housing 14 as shown in FIG. 6 and is fixed also at two points of its rear portion to the upper seating face of housing 14 as shown in FIG. 7. As can be well seen in FIG. 6, at each point of the front fixed portion of the retainer casing, the buffer member 22 is integrally formed at its peripheral portion $22d$ with an annular protrusion $22e$ which is pre-coupled within a mounting hole of retainer casing 23 with a radial press fit; and a washer like synthetic rubber seat 25 is integrally formed with an annular protrusion $25a$ which is also precoupled within the mounting hole of retainer casing 23. In the actual practice, the annular protrusion $22e$ may be integrally formed with the rubber seat 25. In assembling, the retainer casing 23 is fixed at each point of its front peripheral portion by a stepped bolt 26 threaded into the upper seating face of housing 14 through the annular protrusions $22e$ and $25a$ in such a manner that the front portion of retainer casing 23 is floatably secured in place to absorb vibration transmitted thereto from housing 14.

As can be well seen in FIG. 7, the retainer casing 23 is further fixed at each point of its rear peripheral portion by a stepped bolt 26 threaded into the upper seating face of housing 14 through the outer peripheral portion $22d$ of buffer member 22. The stepped bolts 26 are directly engaged with the upper face of the outer peripheral portion of retainer casing 23 to restrict relative displacements of the retainer casing 23 with respect to the extension housing 14. This serves to effectively absorb vibration acting on retainer casing 23 and to obtain smooth operational feel in the shift-and-select operation of shift lever 19. Furthermore, the rear fixing arrangement described above serves to prevent floating of the rear portion of retainer casing 23 and to enhance the durability of rubber seat 25. In case the vertical vibration acting on shift lever 19 is accelerated, the rear fixing arrangement acts to reliably restrain the floating action of shift lever retainer casing 23 and to prevent oil leakage from the fitted portion between buffer member 22 and the upper seating face of housing 14. For inserting the buffer member 22 between retainer casing 23 and the upper seating face of housing 14, it is preferable that the outer peripheral portion $22d$ of buffer member 22 be formed at both its faces with two parallel ridges $22f$ to enhance the sealing effect between the housing 14 and retainer casing 23.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A change-speed gearing unit including an extension housing having an upper seating face, a retainer casing having an outer peripheral portion with mounting holes formed therein and a manual shift lever having a lower end mounted on said retainer casing in a selectively shiftable manner, comprising:

an oil buffer member formed of an elastic material and disposed between said upper seating face of said extension housing and said outer peripheral portion of said retainer casing and wherein said oil buffer member has an outer peripheral portion;

a first plurality of fastening bolts directly engaged with an upper face of said outer peripheral portion of said retainer casing adjacent said lower end of said shift lever and adapted to attach said retainer casing to said extension housing, said first plurality of fastening bolts being adapted to cooperate with said retainer casing and said extension housing;

a plurality of elastic members operatively associated with said mounting holes of said outer peripheral portion of said retainer casing; and a second plurality of fastening bolts respectively engaged through each of said plurality of elastic members with said upper face of said outer peripheral portion of said retainer casing and adapted to floatably secure said retainer casing to said extension housing such that vibrations acting on said retainer casing are absorbed by floating displacement of said retainer casing with respect to said extension housing due to resiliency of said oil buffer member.

2. The improvement as claimed in claim 1, wherein each of said plurality of elastic members further comprises a washerlike synthetic rubber seat integrally formed with an annular protrusion which is pre-coupled within a mounting hole of said retainer casing.

3. The improvement as claimed in claim 1 or 2, wherein the outer peripheral portion of said oil buffer member further comprises a plurality of annular protrusions which are pre-coupled within said mounting holes of said retainer casing for said second plurality of fastening bolts.

4. The improvement as claimed in claim 1 or 2, wherein the outer peripheral portion of said oil buffer member further comprises a plurality of parallel ridges formed on upper and lower faces thereof respectively in engagement with a bottom face of the outer peripheral portion of said retainer casing and the upper seating face of said housing.

* * * * *